(No Model.)

G. W. KAMMERER.
SCREW LOCK.

No. 575,718. Patented Jan. 26, 1897.

Witnesses
Alonzo W. Luther.
Frank H. Lester.

Inventor,
George W. Kammerer,
By Attorney
Frank H. Allen.

UNITED STATES PATENT OFFICE.

GEORGE W. KAMMERER, OF NORWICH, CONNECTICUT.

SCREW-LOCK.

SPECIFICATION forming part of Letters Patent No. 575,718, dated January 26, 1897.

Application filed October 11, 1895. Serial No. 565,431. (No model.)

*To all whom it may concern:*

Be it known that I, GEORGE W. KAMMERER, a citizen of the United States, residing at Norwich, in the county of New London and State of Connecticut, have invented certain new and useful Improvements in Screw-Locks, which improvements are fully set forth and described in the following specification, reference being had to the accompanying sheet of drawings, in which—

Figure 1:
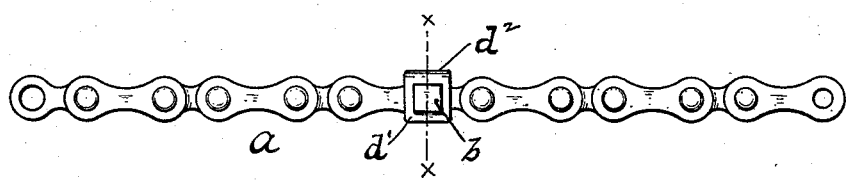
Figure 2:
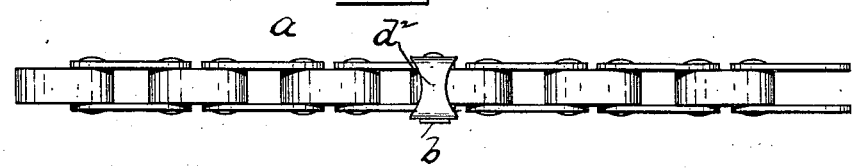
Figure 3:
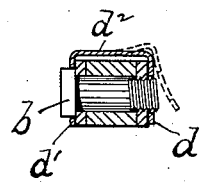

Figures 1 and 2 are respectively side and top views of a section of bicycle-chain having my new lock applied to the screw that joins the ends of said chain. Fig. 3 is a cross-sectional view on line $x$ $x$ of Fig. 1, somewhat enlarged; and Fig. 4 is a perspective view of my new lock.

This invention is in locks for screws with angular heads, and is particularly convenient and valuable for use with sprocket-chains of the class commonly used in bicycles, and I have therefore illustrated said invention as applied to a section of such a chain. It may be stated here briefly that the links of chains of this class are ordinarily inseparably riveted excepting where the end links are joined, and these are detachably hinged together by means of a screw that passes through one of the outside links and is screwed into the opposite outside link. In some instances a check-nut is then screwed home on the projecting end of the screw; but in spite of such precaution the check-nut frequently works loose, allowing the screw to gradually jar out of place and perhaps become lost, thus causing great annoyance to the rider of the cycle and sometimes injury as well.

In the annexed sheet of drawings the letter $a$ denotes a section of sprocket-chain of the form commonly used in bicycles, and $b$ indicates a screw connecting the meeting ends of said chain. Screw $b$ passes freely through the link on one side of the chain and is screwed into the companion link, as seen in Fig. 3.

Figure 4:
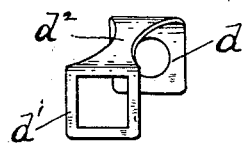

My newly-invented lock, which is perhaps best illustrated in Fig. 4, is formed of sheet spring metal and consists of two opposing perforated plates $d$ $d'$, connected by a bar portion $d^2$, that is preferably reduced in width to render it more elastic or yielding. After the chain ends have been connected by screw $b$, plate $d'$, which is formed with an angular opening, is slipped over the angular head of said screw. The plate $d$, which is formed with a circular opening, is then sprung outward, as in dotted lines in Fig. 3, and is finally forced downward until it snaps over the projecting round end of the screw $b$. (See full lines in Fig. 3.) My described device then serves as a clamp whose ends inclose the two links through which the screw passes. The bar portion $d^2$ of said device rests upon said links and, being thus held against rotation or displacement, prevents the rotation of the integral plates $d$ $d'$, and thus the screw is kept from working loose. In assembling the chain parts the screw $b$ is first passed through one link and then screwed tightly into the companion link. Finally, my locking device is sprung into place, as described, with plate $d'$ inclosing the head of the screw and with plate $d$ surrounding the projecting circular body portion of said screw.

Whenever it is desired to disconnect the chain ends, the screw may be quickly released by springing plates $d$ $d'$ apart and removing the complete device.

My described lock may be very cheaply produced, is easily applied, and provides a positive fastening for the nut and screw.

Having thus described my invention, I claim—

In a device of the character described, a bicycle-chain having one of the outer link-sections threaded, the central link of the opposite end being secured between said outer links, a screw for securing them in combination a spring having a reduced center and its ends bent at right angles to the body, to form spring-plates, one of said plates having a square aperture to fit over the square head of the screw and the opposite plate having a circular aperture to receive the threaded end of the screw, said spring being secured in place with the central portion extending above the surface of the chain, as and for the purpose described.

GEORGE W. KAMMERER.

Witnesses:
FRANK H. ALLEN,
FRANK A. LESTER.